United States Patent
Bollmann et al.

(10) Patent No.: US 11,128,017 B2
(45) Date of Patent: Sep. 21, 2021

(54) BATTERY, CARRIER BOARD, AND CARRIER BOARD ELEMENT HAVING LOCKING ELEMENTS

(71) Applicant: Bayerische Motoren Werke Aktiengesellschaft, Munich (DE)

(72) Inventors: Peter Bollmann, Munich (DE); Kilian Friedrich, Munich (DE); Christian Linse, Munich (DE); Robert Lustig, Munich (DE); Andreas Schleicher, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 77 days.

(21) Appl. No.: 16/505,806

(22) Filed: Jul. 9, 2019

(65) Prior Publication Data

US 2019/0334154 A1  Oct. 31, 2019

Related U.S. Application Data

(63) Continuation of application No. PCT/EP2017/082497, filed on Dec. 13, 2017.

(30) Foreign Application Priority Data

Jan. 10, 2017  (DE) .................... 10 2017 200 311.1

(51) Int. Cl.
*H01M 2/20* (2006.01)
*H01M 50/502* (2021.01)
(Continued)

(52) U.S. Cl.
CPC ....... *H01M 50/502* (2021.01); *H01M 10/425* (2013.01); *H01M 10/4207* (2013.01);
(Continued)

(58) Field of Classification Search
CPC ...... H01M 2/206; H01M 2/1077; H01M 2/22; H01M 2/30; H01M 50/502; H01M 50/528; H01M 50/543; H01M 50/20
See application file for complete search history.

(56) References Cited

U.S. PATENT DOCUMENTS 9,595,705 B1 * 3/2017 Buckhout ........... H01M 2/1223
10,411,309 B2 * 9/2019 Yun .......................... H01M 2/02
(Continued)

FOREIGN PATENT DOCUMENTS

CN  102376916 A  3/2012
CN  102460777 A  5/2012
(Continued)

OTHER PUBLICATIONS

Machine translation of DE 10-2014-205465 (no date).*
(Continued)

*Primary Examiner* — Amanda C. Walke
(74) *Attorney, Agent, or Firm* — Crowell & Moring LLP

(57) ABSTRACT

A carrier board element is provided for the cell connectors of a battery having a plurality of battery cells. The carrier board element has a plurality of cell holders uniformly spaced apart from each other. At least one locking element for the locking in of a cell connector is associated with each of the cell holders. The locking element is arranged on the carrier board element. A plurality of cell connectors can be captively locked in one over the other at the locking elements.

15 Claims, 4 Drawing Sheets

(51) Int. Cl.
  *H01M 10/42* (2006.01)
  *H01M 50/20* (2021.01)
  *H01M 50/528* (2021.01)
  *H01M 50/543* (2021.01)

(52) U.S. Cl.
  CPC ......... *H01M 50/20* (2021.01); *H01M 50/528* (2021.01); *H01M 50/543* (2021.01)

(56) References Cited

U.S. PATENT DOCUMENTS

| | | |
|---|---|---|
| 2005/0174092 A1 | 8/2005 | Dougherty et al. |
| 2012/0088143 A1 | 4/2012 | Lietz et al. |
| 2012/0141853 A1* | 6/2012 | Eberhard ............ H01M 2/1077 429/98 |
| 2012/0244397 A1 | 9/2012 | TenHouten et al. |
| 2013/0244499 A1 | 9/2013 | Heck et al. |
| 2015/0144409 A1 | 5/2015 | Fujii |
| 2015/0295280 A1 | 10/2015 | Cho et al. |
| 2016/0043448 A1 | 2/2016 | Fritz |
| 2017/0012269 A1 | 1/2017 | Grzywok et al. |
| 2018/0013113 A1* | 1/2018 | Wuensche ............ H01M 2/1083 |
| 2019/0013502 A1* | 1/2019 | Brenner .................. B60L 50/64 |
| 2019/0058171 A1* | 2/2019 | Rejman ................ H01M 10/00 |
| 2020/0313141 A1* | 10/2020 | Liu ...................... H01M 2/1077 |
| 2020/0381789 A1* | 12/2020 | Ing .......................... B60L 50/64 |

FOREIGN PATENT DOCUMENTS

| | | |
|---|---|---|
| CN | 102668165 A | 9/2012 |
| CN | 102782896 A | 11/2012 |
| CN | 103311487 A | 9/2013 |
| CN | 103456902 A | 12/2013 |
| CN | 104183809 A | 12/2014 |
| CN | 104321905 A | 1/2015 |
| CN | 104979517 A | 10/2015 |
| CN | 105144433 A | 12/2015 |
| CN | 105144463 A | 12/2015 |
| CN | 105794015 A | 7/2016 |
| CN | 105845854 A | 8/2016 |
| CN | 106104847 A | 11/2016 |
| DE | 10 2009 024 514 A1 | 12/2010 |
| DE | 10 2013 207 356 A1 | 10/2014 |
| DE | 10 2014 205 465 A1 | 9/2015 |
| EP | 2 639 857 A1 | 9/2013 |
| WO | WO 2010/142658 A1 | 12/2010 |
| WO | WO 2012/009090 A1 | 1/2012 |
| WO | WO 2012/052131 A9 | 4/2012 |
| WO | WO 2013/000908 A1 | 1/2013 |
| WO | WO 2015/144542 A1 | 10/2015 |

OTHER PUBLICATIONS

International Search Report (PCT/ISA/210) issued in PCT Application No. PCT/EP2017/082497 dated Mar. 16, 2018 with English translation (five pages).

German-language Written Opinion (PCT/ISA/237) issued in PCT Application No. PCT/EP2017/082497 dated Mar. 16, 2018 (five pages).

German-language Search Report issued in counterpart German Application No. 10 2017 200 311.1 dated Oct. 5, 2017 with partial English translation (12 pages).

English-language Chinese Office Action issued in Chinese application No. 201780063149.6 dated Apr. 1, 2021 (Ten (10) pages).

* cited by examiner

BATTERY, CARRIER BOARD, AND CARRIER BOARD ELEMENT HAVING LOCKING ELEMENTS

CROSS REFERENCE TO RELATED APPLICATIONS

This application is a continuation of PCT International Application No. PCT/EP2017/082497, filed Dec. 13, 2017, which claims priority under 35 U.S.C. § 119 from German Patent Application No. 10 2017 200 311.1, filed Jan. 10, 2017, the entire disclosures of which are herein expressly incorporated by reference.

BACKGROUND AND SUMMARY OF THE INVENTION

The invention relates to a carrier board element for the cell connectors of a battery with a plurality of battery cells, a carrier board with a plurality of such carrier board elements and a battery with a plurality of battery cells and such a carrier board.

Lithium ion battery modules (also called a battery below) for hybrid and electric cars, as well as also many other batteries, comprise a plurality of battery cells, which are wired electrically to one another via metallic cell connectors (also called bus bars).

Depending on the desired drive power and/or battery voltage, such batteries can differ in the number of installed battery cells (i.e. module size), in the electric wiring (for example purely serial connection versus parallel/serial connection) and/or in the achievable current-carrying capacity (i.e. power class).

In the manufacture of such batteries, it is a challenge to produce a large number of different battery types, which can differ virtually arbitrarily in the embodiments cited in the previous paragraph, with the lowest possible outlay.

In practice, it has proven worthwhile that, for various battery types, the same battery cells are always used, which then, depending on the requirement, are wired suitably in series and/or in parallel, so that different operating voltages can be achieved and/or different outputs can be obtained.

For example,—even in different battery types—in principle the individual, for example cartridge-like, battery cells are arranged with adjacent wide sides on one another and then differ only in the electric wiring.

For the electric wiring, in many conventional battery types, the battery cells are exposed to a cell contacting system on their contact side (i.e. the cell side with positive and negative battery cell terminals), in which, according to the desired wiring, the cell connectors are connected selectively to individual poles of battery cells and to one another.

In a known embodiment of such a cell contacting system, the latter comprises a plurality of carrier plates, which are clipped to one another and are configured such that they can only be used with the cell connectors matched to the geometry of the respective carrier plates.

Such cell contacting systems firstly have high length tolerances along the stacking direction of the battery cells and, because of the selected geometry of the carrier plates, are also defined for a specific wiring type.

The plurality of battery types mentioned at the beginning can be covered with such carrier plates only with regard to the number of battery cells used but not with regard to different parallel/serial electric wiring or different powers to be transmitted.

It is therefore an object of the invention to provide a simpler cell contacting system which has a wider area of application with regard to different battery types.

The carrier board element according to the invention for the cell connectors of a battery with a plurality of battery cells has a plurality of cell holders spaced uniformly apart from one another, each of the cell holders being assigned at least one locking element, which is arranged on the carrier board element, for a cell connector to be locked in. According to the invention, a plurality of cell connectors can be captively locked in above one another on the locking elements.

The carrier board according to the invention has at least two carrier board elements in the sense of the invention, wherein adjacent carrier board elements can be fixed to one another by means of a tongue-and-groove connection and by means of the cell connectors to be locked in on the locking elements, and/or can be fixed to one another by means of a plastic welded connection.

The battery according to the invention has a plurality of battery cells and a carrier board in the sense of the invention. The number of carrier board elements of the battery is matched to the number of battery cells. More than one cell connector is locked in on at least one of the locking elements.

The invention is based, amongst other things, on the idea of inserting a carrier board that can be adapted relatively freely with respect to the number of battery cells to be connected in a battery but which, despite this flexibility, permits a free configuration of the cell connectors themselves. Because the individual carrier board elements permit captive locking in of a plurality of cell connectors on one another, a large variation in battery types can be achieved with few different or even only one single cell connector geometry on the basis of the always identical battery cells.

Thus, for example, with the carrier board elements according to the invention, in a region in which two equal types of poles of two battery cells are wired in parallel, because of the low required current-carrying capacity only a single cell connector can be locked in, while in another region, in which the current from said two previously parallel-wired battery cells must be carried, two or three cell connectors are locked in in order to be able to achieve the necessary higher current-carrying capacity.

For the purposes of the invention, it is sufficient that the locking in is merely made "captively"; this is because it primarily concerns the efficient preparation of the final assembly of the battery, in which the cell connectors are then connected suitably to the battery poles in any case, for example welded or in another way. In the sense of the invention, "captively" therefore does not necessarily mean that the cell connectors are already 100% fixed at the moment in which they are locked in. Therefore, it is also possible to use different exemplary embodiments of such captive locking elements, described later, in which at least the first cell connector that is locked in can still be lifted away, for example in the direction from the battery pole (until it is then welded on). Despite this, in the sense of the invention provision can nevertheless be made—specifically when locking in a maximum envisaged number of cell connectors—for the cell connectors to be seated firmly in the locking elements even before welding (not belonging to the invention) to the poles.

According to a preferred embodiment, a locking element has a central axis, around which there are arranged at least two, in particular three or four, snap-in hooks locking radially with respect to the central axis, which are preferably formed in one piece with a carrier board element. This embodiment has the advantage that, if necessary, a single locking element can already be sufficient to lock in one or more cell connectors one above another captively on the carrier board element. Preferably, to this end the cell connectors are formed from a current-carrying metallic material and/or have a cut-out, the diameter of which is matched to the snap-in hooks such that the latter lock in when the locking element with the snap-in hooks is led through. Within the context of this application, mention is made of locking a cell connector in the locking element when said cell connector having such a cut-out is brought up to a locking element and the snap-in hooks are led through the cut-out, so that they lock in.

According to an alternative preferred embodiment, the locking element has a central axis and a, in particular, hot-pressed pin extending along thereon. This alternative can be simpler in terms of production but, because of the low available elastic deformability of the hot-pressed pin (as compared with the plurality of snap-in hooks according to the other alternative), requires closer coordination of the dimensions of the cut-out of the cell connector, on the one hand, and of the hot-pressed head of the pin, on the other hand.

According to another preferred embodiment, on the other hand, a locking element can be installed which, in addition to an element having locking hooks (as in the two alternatives described first), additionally needs a stop on the body of the carrier board element. In this embodiment, the locking element has at least two, in particular three, snap-in hooks spaced apart differently from a main plane of the carrier board element, and a mating stop, wherein each of the snap-in hooks is connected to the carrier board element, preferably formed in one piece with the latter, and the snap-in hooks are arranged adjacent to one another, in particular beside one another.

In this configuration, the need to provide a cut-out in the cell connector, which contributes to the security against loss in the two first-described alternatives, in particular in a closed embodiment of the cut-out, is dispensed with. The security against loss in the embodiment described here results from the (in particular elastic) clamping of the cell connector between the snap-in hooks and the mating stop. As a result of the provision of a plurality of snap-in hooks arranged beside one another at a different distance from a main plane of the carrier board element, there is the possibility of locking in one, two or three cell connectors.

In order in particular also to be able to build batteries with standard battery cell types in the sense of the invention, according to a preferred embodiment a carrier board element having at least two cell connector rows is provided, each of which provides a plurality of uniformly spaced cell holders.

Here, the mechanical stability of a carrier board having a plurality of such carrier board elements can preferably be improved by the cell connector rows being arranged offset relative to one another, preferably by the spacing of two adjacent cell holders of a row. As a result of the offset course of the edge of the body of the carrier board element, the latter can introduce more structural reinforcement into the carrier board in its function as a connecting element to the corresponding edge of the adjacent carrier board element.

According to a preferred embodiment, the carrier board additionally has a front and a rear current tap-off element, wherein each of the current tap-off elements is connected to one of the carrier board element. Preferably, the front current tap-off element, the rear current tap-off element and the carrier board elements that are arranged between the same form the carrier board, wherein the connection between one of the current tap-off elements and the adjacent carrier board element is preferably formed in the same way as a connection of two adjacent carrier board elements. Likewise, preferably, on each of the current tap-off elements, there is provided at least one cell holder which, on account of the connection to the adjacent carrier board element, is spaced apart from the cell holders of the carrier board element in exactly the same way as the cell holders are spaced from one another. As used herein, the current tap-off elements can preferably each be understood as a type of "terminating carrier board element", which permits the wired cell connectors to be connected, for example, to further layers of a battery module.

According to a preferred embodiment, the number of carrier board elements is matched to the number of battery cells of the battery. Thus, in the individual application, the size of the carrier board can be matched to the number of battery cells. If currents of different sizes have to be transported between individual battery cells, for example when a plurality of adjacent cells are each wired in parallel with one another, and said "parallel packs" are in turn connected in series, provision can preferably made that, in order to improve the current-carrying capacity between the "parallel packs", more than one cell connector is locked in on at least one of the locking elements. This ensures that, in the region of a higher current-carrying load, instead of an individual cell connector, a greater material cross section (in the form of multiple cell connectors) is available to carry the current.

Preferably, to connect at least two battery cells, a second cell connector is locked in on a locking element above a first cell connector which connects more than two battery cells. Alternatively preferably, to connect at least two battery cells, a second cell connector can be arranged between two first cell connectors, wherein the second cell connector has an overlap region with each of the first cell connectors, on which both cell connectors are locked in by way of a locking element. In order to achieve a further improved current-carrying capacity, a third cell connector can if necessary be locked in over the second cell connector.

In order to permit space-saving integration of a suitable battery control system, a socket or a pin bar for a plug of the battery control system, in particular for a BMS socket or a BMS pin bar, is arranged above the cell connectors.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
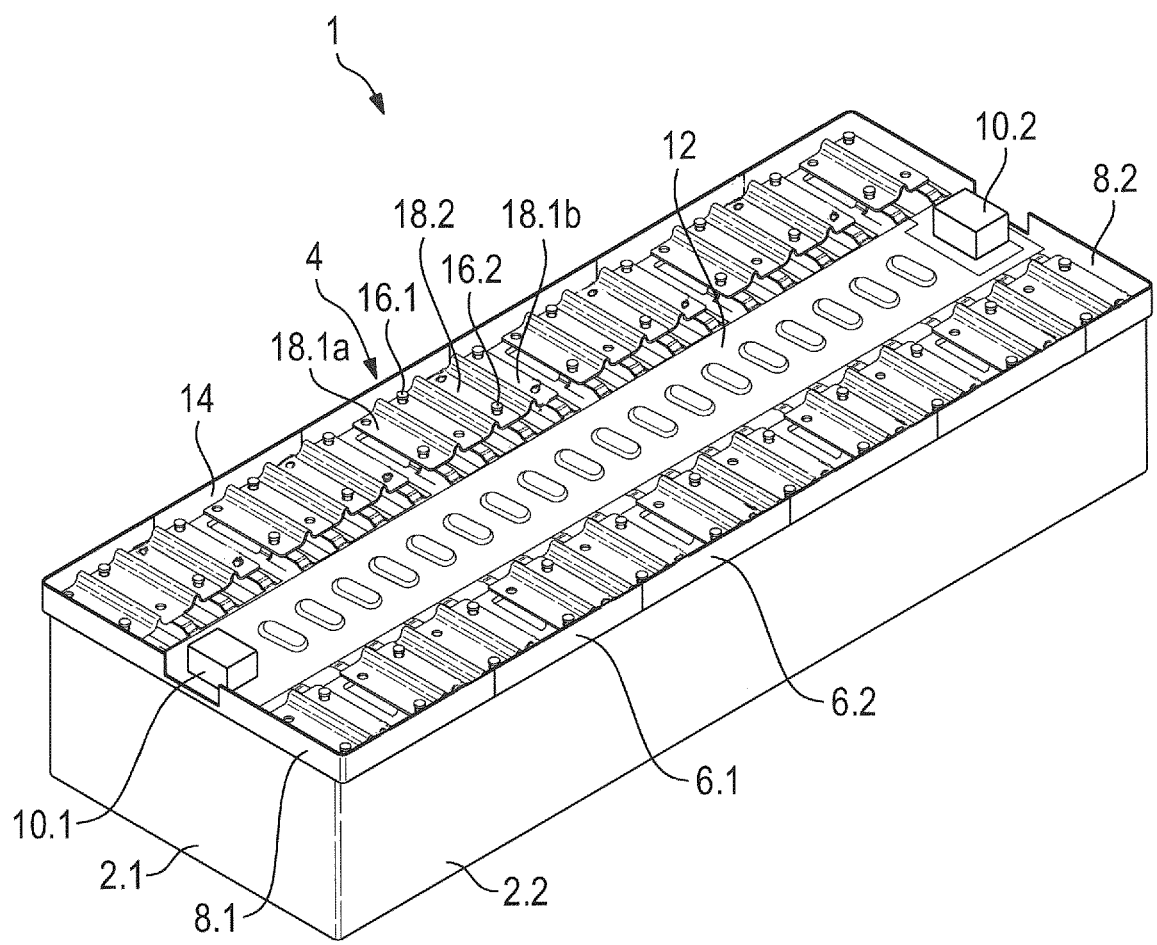
FIG. 1 shows a battery with a plurality of battery cells and a carrier board according to an exemplary embodiment in an oblique view.

FIG. 1 shows a battery 1 having twenty-two battery cells 2. The battery 1 has a carrier board 4, which is assembled from a plurality (four here) of carrier board elements 6 and a front current tap-off element 8.1 and a rear current tap-off element 8.2.

The battery 1 in the exemplary embodiment is provided with 11s2p wiring, which means respectively two adjacent battery cells 2 are connected in parallel with one another, and eleven of said adjacent battery cells connected in parallel with one another are wired to one another in series. In other exemplary embodiments, not shown, of course similar types of wiring systems with a different number of battery cells or of battery cells connected in parallel with one another are likewise contemplated, as well as purely serial wiring systems.

The battery 1 additionally has current tap-off sockets 10 for connection to further batteries and/or to the power takeoff.

On the carrier board 4 and therefore also on the individual carrier board elements 6, at uniform distances on both sides of a central flexible circuit board 12 for measuring and controlling the battery cells, there are arranged cell holders 14, which can be seen only poorly in FIG. 1 (the cell holders 14 can be seen clearly in FIG. 2).

In the region of the cell holders 14, on the carrier board elements 6 (in the exemplary embodiment in different positions relative to the cell holders, although this does not necessarily have to be so) there are arranged locking elements 16, on which a plurality of cell connectors can be captively locked in above one another.

From the illustration of FIG. 1 it can be seen that, for the parallel wiring of respectively two adjacent battery cells 2 on a first plane beside one another, two first cell connectors 18.1a and 18.1b are locked into the locking element 16 and, on a second plane, additionally a second cell connector 18.2 is locked into the locking element 16. This second cell connector 18.2 connects the first cell connectors 18.1a and 18.1b to each other in a current-carrying manner.

Figure 2A:
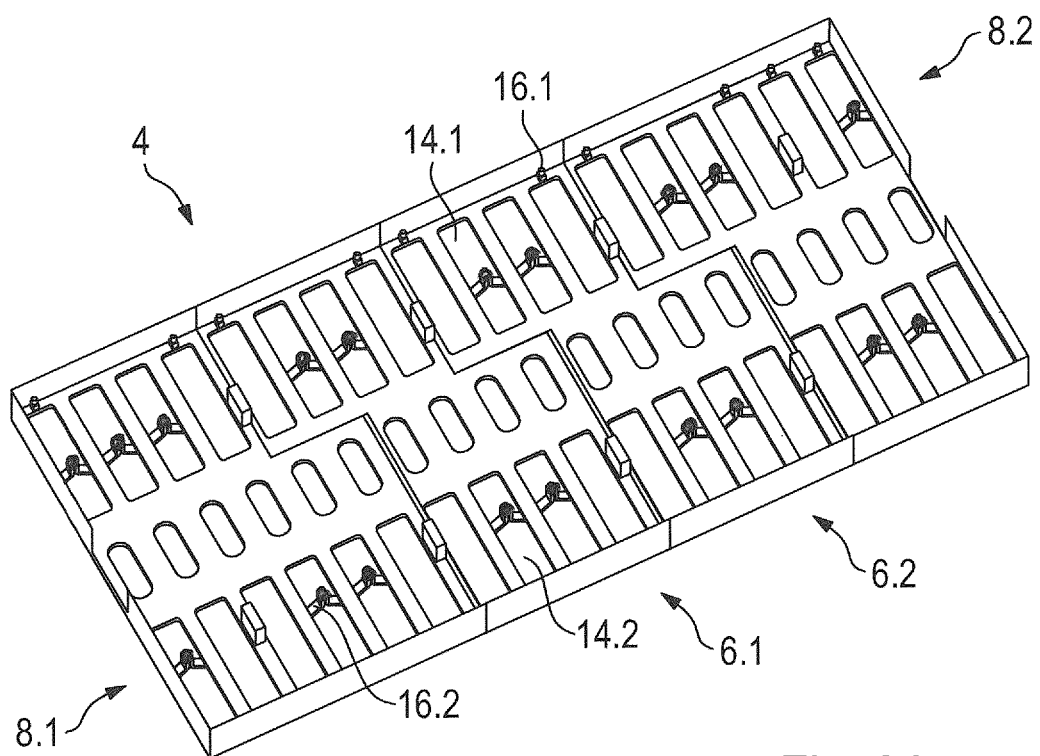
FIGS. 2A and 2B show a carrier board according to an exemplary embodiment in a connected state (FIG. 2A) and the carrier board elements thereof in a non-connected state (FIG. 2B).

FIG. 2A shows a carrier board 4 which is assembled from a front current tap-off element 8.1, two carrier board elements 6.1 and 6.2 and a rear current tap-off element 8.2. The locking elements 16.1 and 16.2 can also be seen easily in FIG. 2A.

Likewise, it is easy to see that the boundary between the individual elements 6 and 8 extends so as to be offset approximately by the width of two cell holders 14, based on the divided arrangement of the cell holders 14 into two parallel cell holder rows.

Figure 2B:
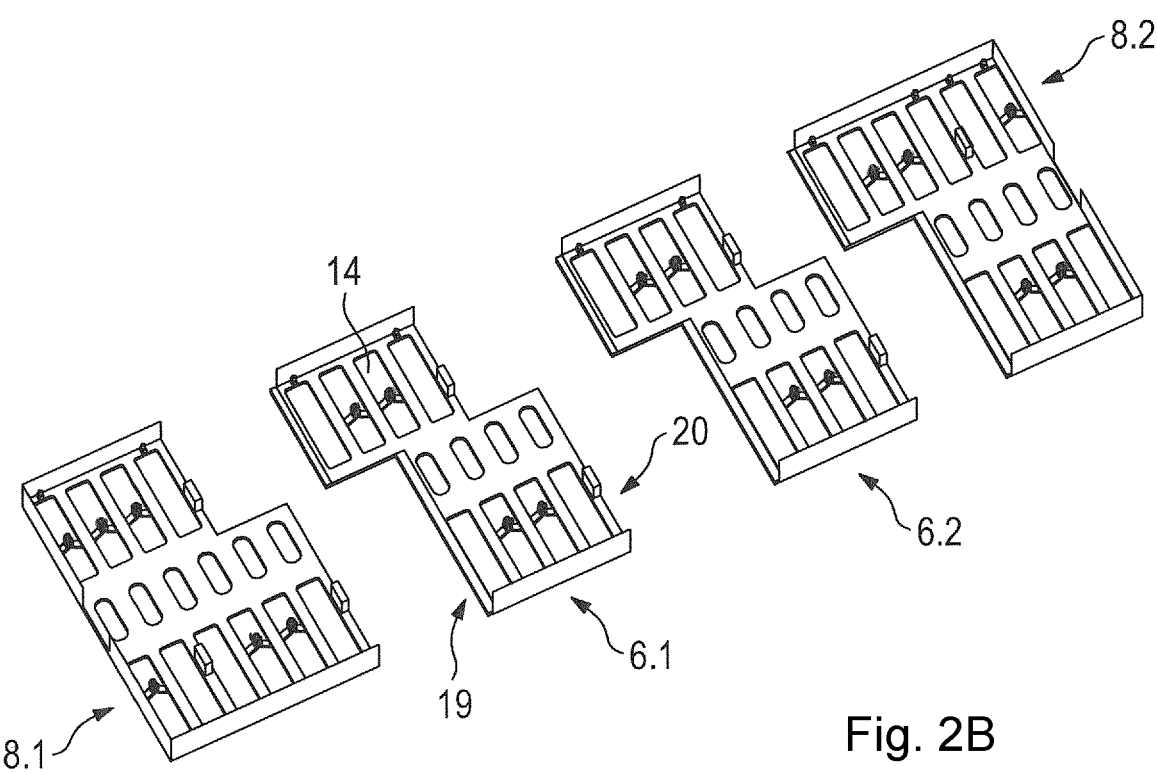

FIG. 2B shows the carrier board 4 from FIG. 2A in an unassembled state. It can be seen that the carrier board elements 6.1 and 6.2 each have a tongue 19 on the left-hand side and a groove 20 on the right-hand side belonging to a tongue-and-groove connection for the assembly of the carrier board 4. The current tap-off elements 8 are formed such that they can be connected appropriately to the carrier board elements.

Figure 3A:
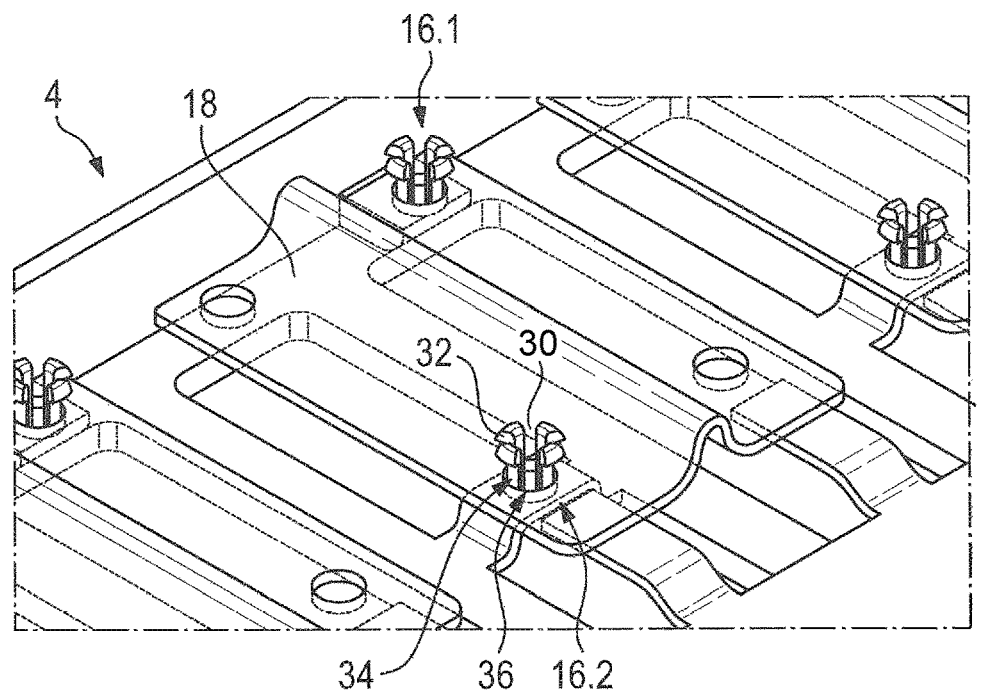
FIGS. 3A, 3B and 3C show different exemplary embodiments of locking elements: radially arranged snap-in hooks in an oblique view (FIG. 3A), hot-pressed pins in a lateral sectional view (FIG. 3B), and snap-in hooks arranged linearly beside one another and having a mating stop in an oblique view (FIG. 3C).

FIG. 3A shows a detail of the carrier board 4 in one embodiment, in which the locking elements 16 are formed with four snap-in hooks 30 arranged in an almost mushroom-like manner—that is to say around a central axis. Each of the four snap-in hooks 30 has a snap-in element 32 and a spring arm 34.

If then—as shown in FIG. 3A—a cell connector 18 is locked at its cut-outs 36 into the locking elements 16.1 and 16.2 of the carrier board, the spring arms 34 spring back, since a force toward the central axis is applied to the chamfers of the snap-in hooks 32. If the cell connector 18 is then pressed down further, the cut-out 36 passes the snap-in hooks 32, so that the spring arms 34 can spring back. After the locking in, the snap-in hooks 32 function as barbs, which ensure the captive attachment of the cell connector 18 to the carrier board 4.

As a result of the locking in on two locking elements 16.1, 16.2 in the exemplary embodiment illustrated, the cell connector 18 is connected not only captively but also rotationally fixedly to the carrier board 4.

Figure 3B:
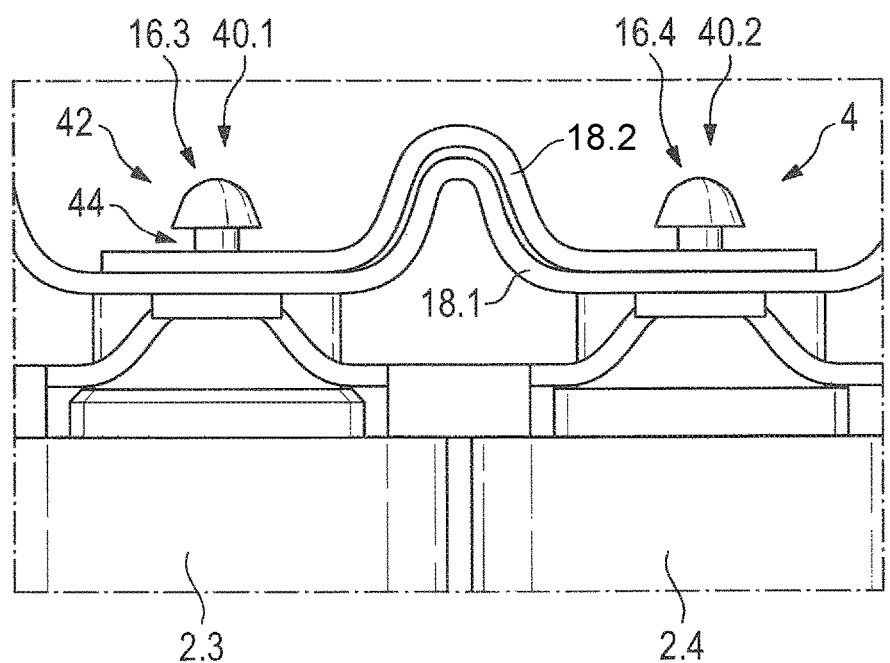

FIG. 3B shows a lateral sectional view of a detail of a battery 1 having battery cells 2.3 and 2.4. In this exemplary embodiment, the locking elements 16 are embodied as a hot-pressed pin 40 having a head 42 and a spacer 44.

From FIG. 3B it can additionally be seen that firstly a first cell connector 18.1 and then a second cell connector 18.2 are locked in on the locking elements 16.

In this exemplary embodiment, the locking in functions in a similar way to that according to FIG. 3A. The only difference is that the elastic deformation needed to lock the cell connectors 18 in results from an elastic material deformation of the head 42 of the pin 40, which occurs when a cell connector 18 is moved downward on the head 40 formed approximately semi-circularly at the top.

The plastic material used for the pin 40 must therefore have a sufficiently high elastic deformability which is greater than that needed with the snap-in hooks 30 according to FIG. 3A. The appropriate elasticities and materials of the locking elements can be provided in a manner known per se.

Figure 3C:
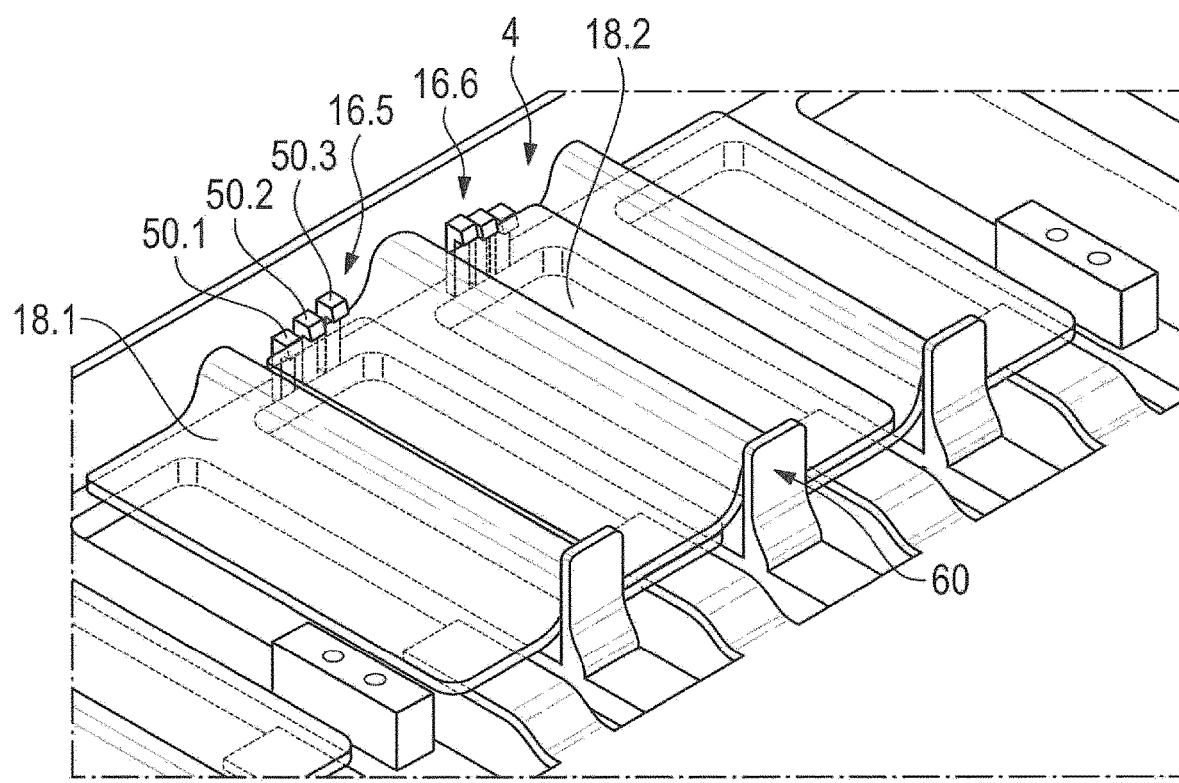

FIG. 3C shows a detail of a carrier board 4 having locking elements 16 which are formed as snap-in hooks 50 arranged linearly beside one another with a mating stop 60.

Each of the locking elements in the exemplary embodiment is formed with three snap-in hooks 50.1, 50.52.3 arranged linearly beside one another.

In the illustration of FIG. 3C, the snap-in hook 50.1 illustrated on the left has the shortest spring arm, which is sufficiently long to lock in a first cell connector 18.1 captively with its wall thickness on the carrier board 4 when the cell connector bears on the mating stop 60 on the other side. The snap-in hook 50.2 illustrated in the middle already has a longer spring arm in order—as illustrated in the figure—additionally to lock in a second cell connector 18.2 when the latter in turn bears on the mating stop 60 on the other side. The snap-in hook 50.3 illustrated on the right has a still longer spring arm, which additionally permits a third cell connector (not illustrated) to be held.

LIST OF DESIGNATIONS

1 Battery
2 Battery cells
4 Carrier board
6 Carrier board element
8 Current tap-off element
10 Current tap-off socket
12 Flexible circuit board
14 Cell holders
16 Locking element
18 Cell connector
19 Tongue
20 Groove
30 Snap-in hook
32 Snap-in element
34 Spring arm
36 Cut-out
40 Pin 42 Head
44 Spacer
50 Snap-in hook
60 Mating stop The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A carrier board element for cell connectors of a battery having a plurality of battery cells, comprising:
    a plurality of cell holders spaced uniformly apart from one another, each of said cell holders being assigned at least one locking element for a cell connector to be locked in, wherein
    the at least one locking element of each cell holder is arranged on the carrier board element,
    a plurality of cell connectors are captively lockable-in one above another on the locking elements, and
    a locking element has a central axis, around which there are arranged at least two snap-in hooks locking radially with respect to the central axis.

2. The carrier board element as claimed in claim 1, wherein
    there are three or four snap-in hooks.

3. A carrier board element for cell connectors of a battery having a plurality of battery cells, comprising:
    a plurality of cell holders spaced uniformly apart from one another, each of said cell holders being assigned at least one locking element for a cell connector to be locked in, wherein
    the at least one locking element of each cell holder is arranged on the carrier board element,
    a plurality of cell connectors are captively lockable-in one above another on the locking elements, and
    a locking element has a central axis and a hot-pressed pin extending along thereon.

4. The carrier board element as claimed in claim 1, further comprising:
    at least two cell connector rows each with a plurality of uniformly spaced cell holders.

5. The carrier board element as claimed in claim 4, wherein
    the cell connector rows are arranged so as to be offset from one another.

6. The carrier board element as claimed in claim 5, wherein
    the offset is a spacing of two adjacent cell holders of a row.

7. A carrier board, comprising:
    at least two carrier board elements as claimed in claim 1, wherein
    adjacent carrier board elements are fixable to one another by a tongue-and-groove connection and by the cell connectors to be locked in on the locking elements.

8. A carrier board, comprising:
    at least two carrier board elements as claimed in claim 1, wherein
    adjacent carrier board elements are fixable to one another by a plastic welded connection.

9. The carrier board as claimed in claim 7, further comprising:
    a front and a rear current tap-off element, wherein
    each of the current tap-off elements is connected to one of the carrier board elements.

10. A battery, comprising:
    a plurality of battery cells; and
    a carrier board as claimed in claim 7, in which the number of the carrier board elements is matched to the number of battery cells, wherein more than one cell connector is locked-in on at least one of the locking elements.

11. The battery as claimed in claim 10, wherein
    to connect at least two battery cells, a second cell connector is locked-in on a locking element above a first cell connector which connects more than two battery cells.

12. The battery as claimed in claim 10, wherein
    to connect at least two battery cells, a second cell connector is arranged between two first cell connectors, wherein the second cell connector has an overlap region with each of the first cell connectors, on which both cell connectors are locked-in by a locking element.

13. The battery as claimed in claim 11, wherein a third cell connector is locked-in above the second cell connector.

14. The battery as claimed in claim 10, wherein
    a socket or a pin bar for a plug of a battery control system is arranged above the cell connectors.

15. The battery as claimed in claim 14, wherein
    the socket or the pin bar is a BMS socket or a BMS pin bar.

* * * * *